United States Patent
Kwon et al.

(10) Patent No.: US 7,912,476 B2
(45) Date of Patent: Mar. 22, 2011

(54) METHOD OF CONTROLLING BASE STATIONS TO SUPPRESS INTER-CELL INTERFERENCE

(75) Inventors: Jae Kyun Kwon, Daejeon (KR); Hee Soo Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 951 days.

(21) Appl. No.: 11/720,838

(22) PCT Filed: Dec. 5, 2005

(86) PCT No.: PCT/KR2005/004114
§ 371 (c)(1),
(2), (4) Date: Jun. 4, 2007

(87) PCT Pub. No.: WO2006/062316
PCT Pub. Date: Jun. 15, 2006

(65) Prior Publication Data
US 2009/0233616 A1    Sep. 17, 2009

(30) Foreign Application Priority Data

Dec. 8, 2004  (KR) .................. 10-2004-0103238
May 4, 2005  (KR) .................. 10-2005-0037602

(51) Int. Cl.
*H04W 72/08* (2009.01)
*H04W 52/38* (2009.01)
(52) U.S. Cl. ............... 455/452.2; 455/524; 455/561; 455/522; 455/69; 455/67.11
(58) Field of Classification Search .................. None
See application file for complete search history.

(56) References Cited

U.S. PATENT DOCUMENTS

| | | | | |
|---|---|---|---|---|
| 5,914,947 | A * | 6/1999 | Saito | 370/337 |
| 6,078,815 | A * | 6/2000 | Edwards | 455/450 |
| 6,370,383 | B1 * | 4/2002 | Leatham et al. | 455/446 |
| 6,473,418 | B1 | 10/2002 | Laroia et al. | |
| 6,539,233 | B1 * | 3/2003 | Taketsugu | 455/522 |
| 6,597,911 | B1 * | 7/2003 | Kransmo | 455/436 |
| 6,711,120 | B1 | 3/2004 | Laroia et al. | |
| 7,184,709 | B2 * | 2/2007 | Qiu et al. | 455/524 |
| 2006/0154684 | A1 * | 7/2006 | Meiyappan | 455/522 |

FOREIGN PATENT DOCUMENTS

| | | |
|---|---|---|
| CN | 1399431 A | 2/2003 |
| JP | H05-063634 | 3/1993 |
| JP | 2002-159048 | 5/2002 |
| JP | 2003-153335 | 5/2003 |
| JP | 2004-159289 | 6/2004 |
| KR | 1020040076438 A | 9/2004 |

* cited by examiner

*Primary Examiner* — Philip J Sobutka

(57) ABSTRACT

A method of controlling base stations that is capable of suppressing inter-cell interference and efficiently utilizing available resources. According to one aspect, information received on path loss from a terminal is used to determine a time region for the terminal based on the path loss information. Communication with the terminal is performed within the determined time region. According to another aspect, information received on path loss from a terminal is used to determine a frequency region for the terminal based on the path loss information. Communication with the terminal is performed within the determined frequency region. According to yet another aspect, information received on path loss from a terminal is used to determine a code region for the terminal based on the path loss information. Communication with the terminal is performed within the determined code region.

21 Claims, 7 Drawing Sheets

[Fig. 1]
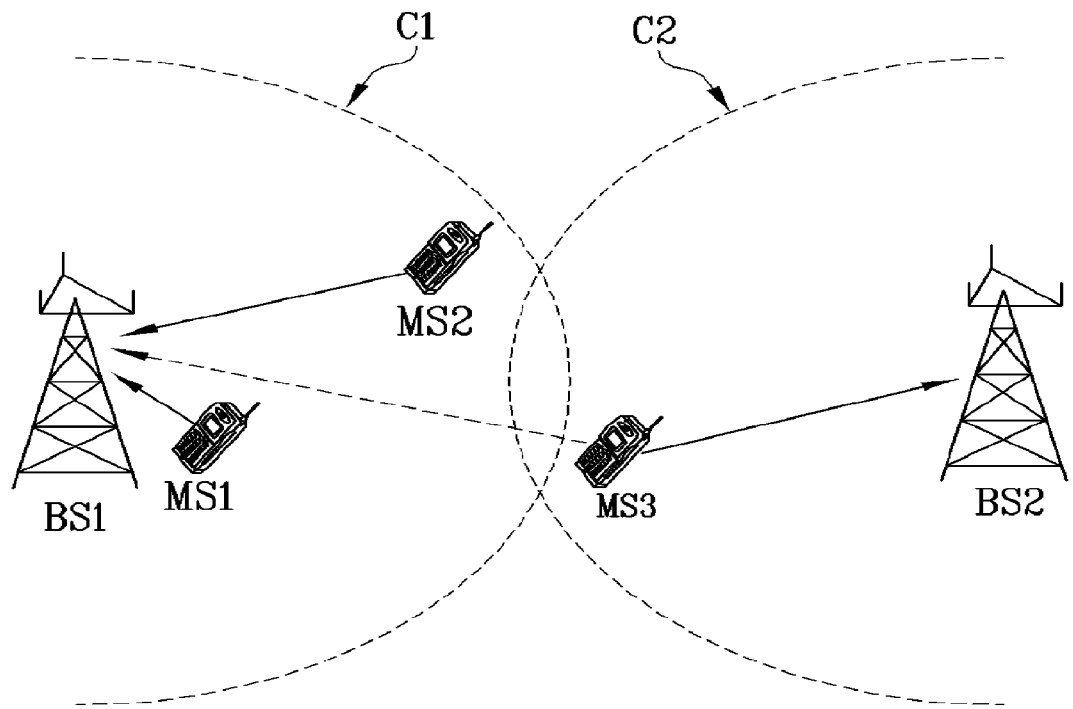
[Fig. 2]
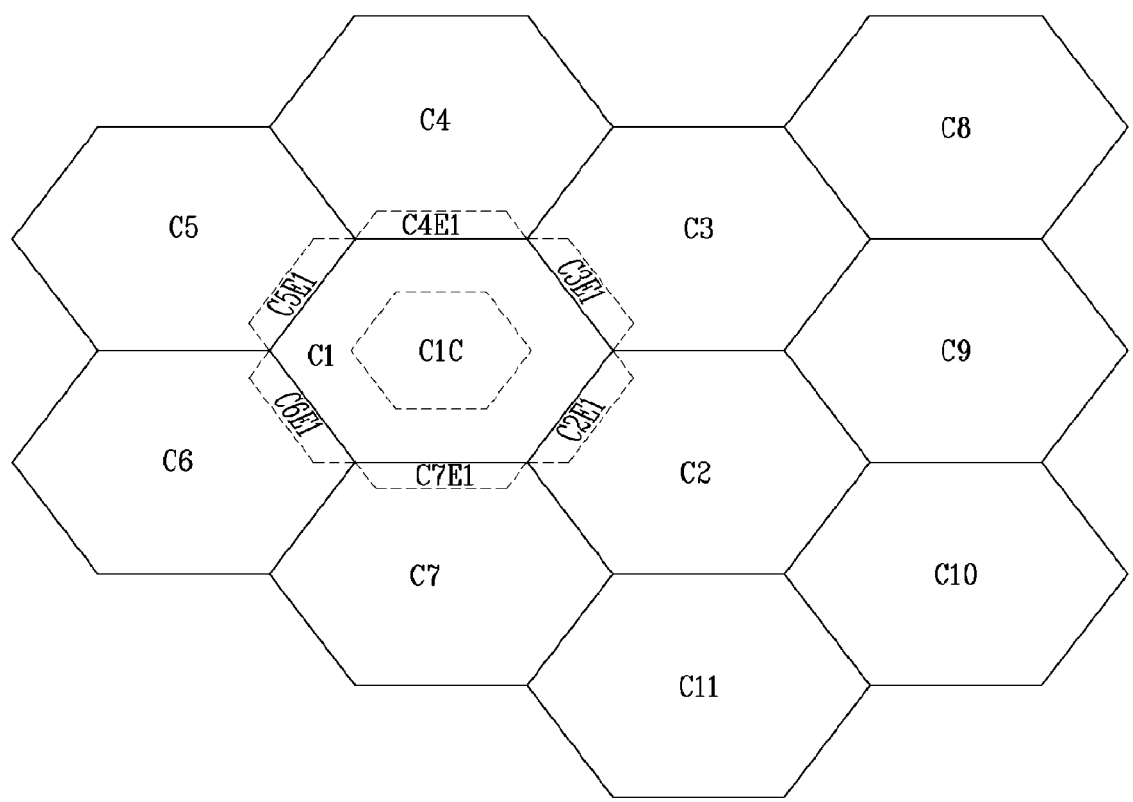

[Fig. 3]
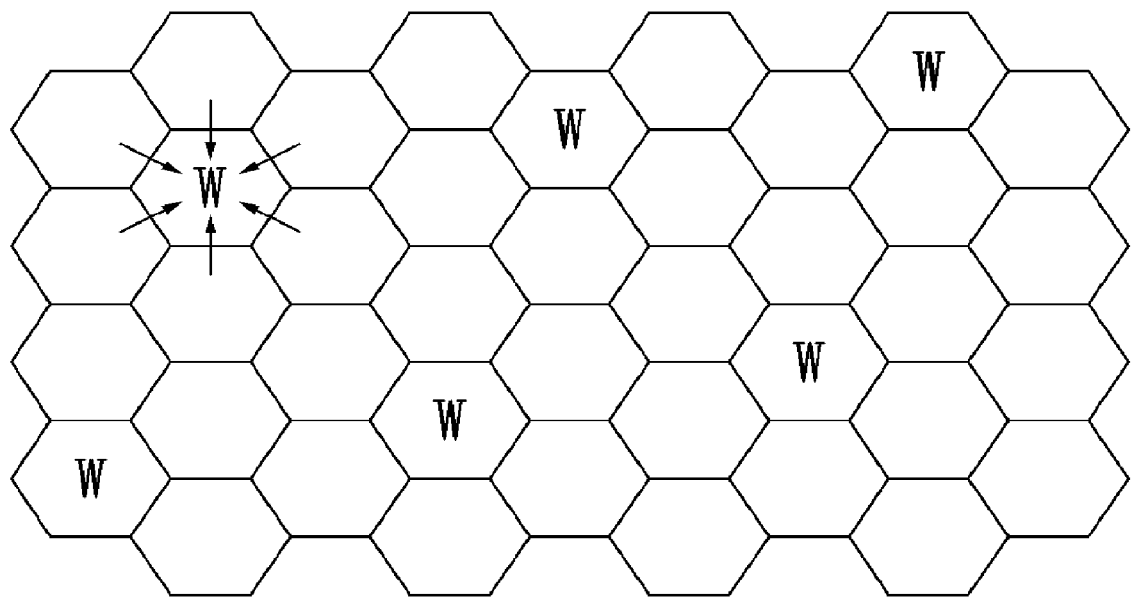
[Fig. 4]
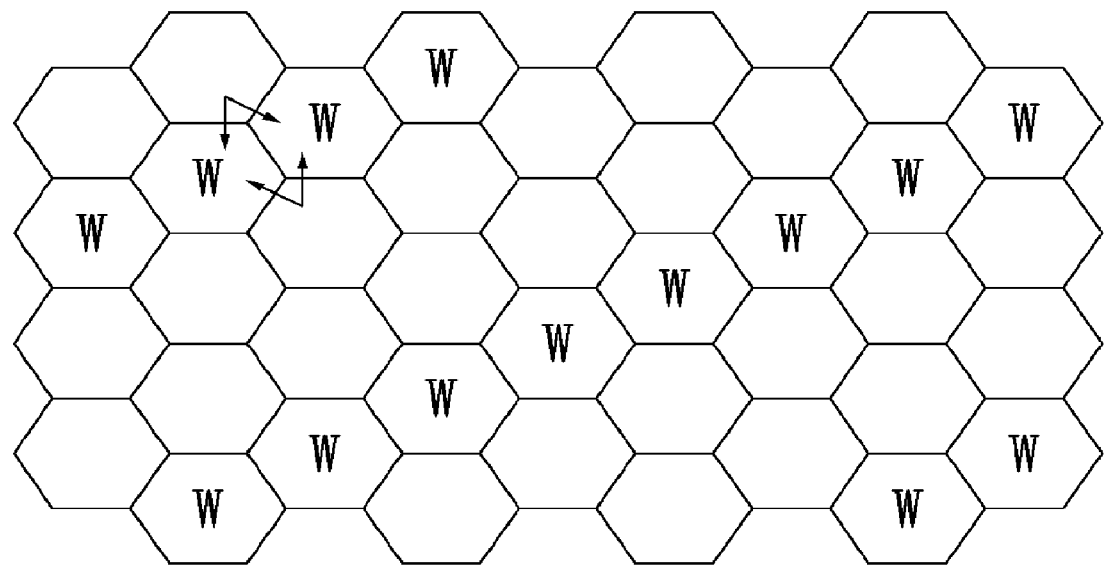

[Fig. 5]
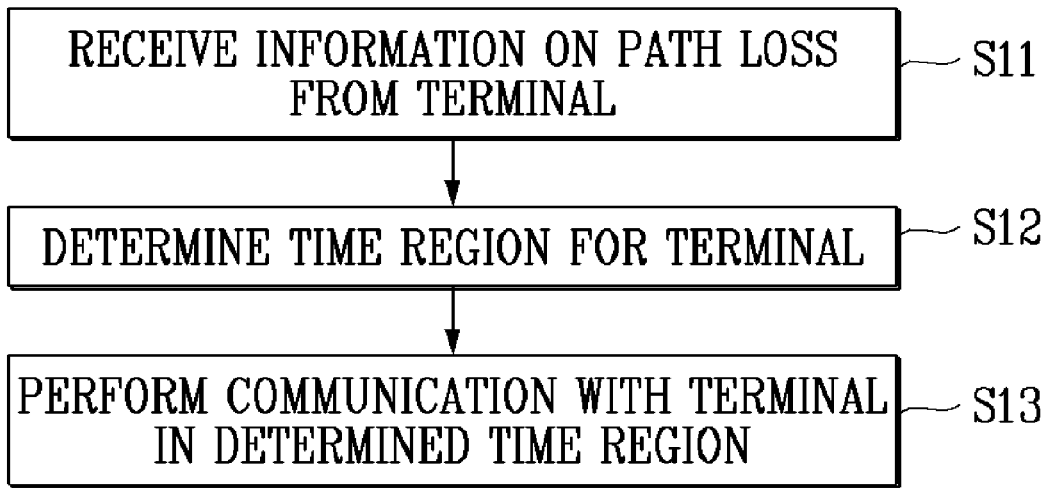
[Fig. 6]
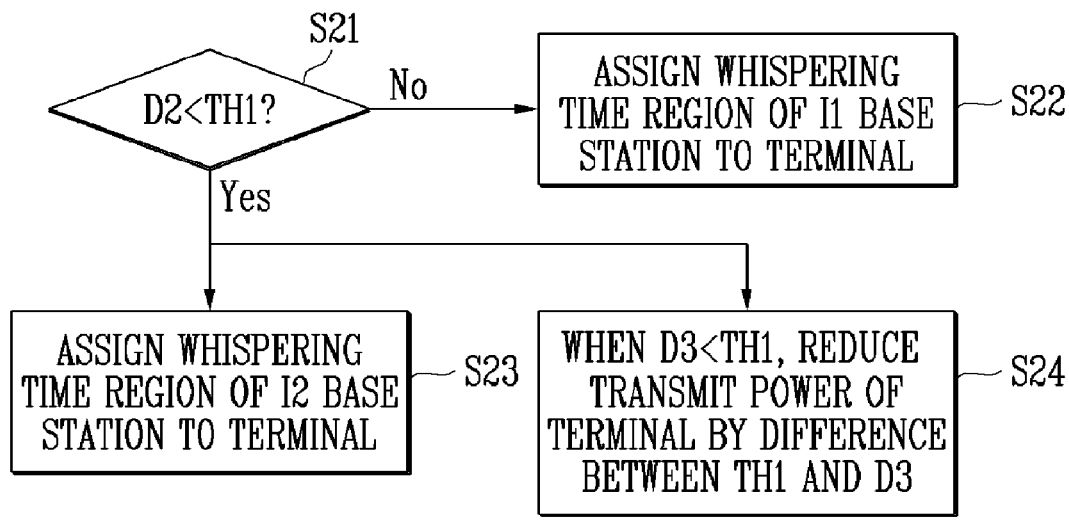
[Fig. 7]
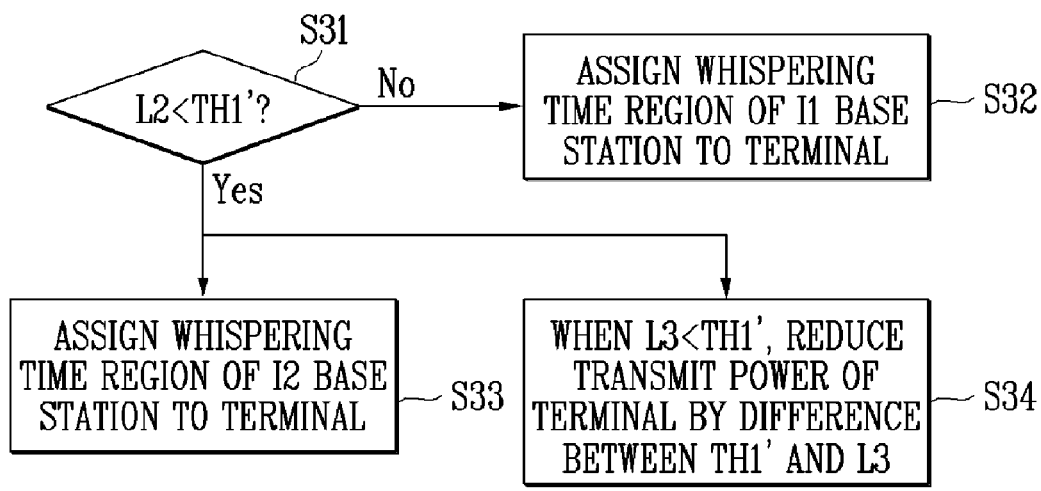

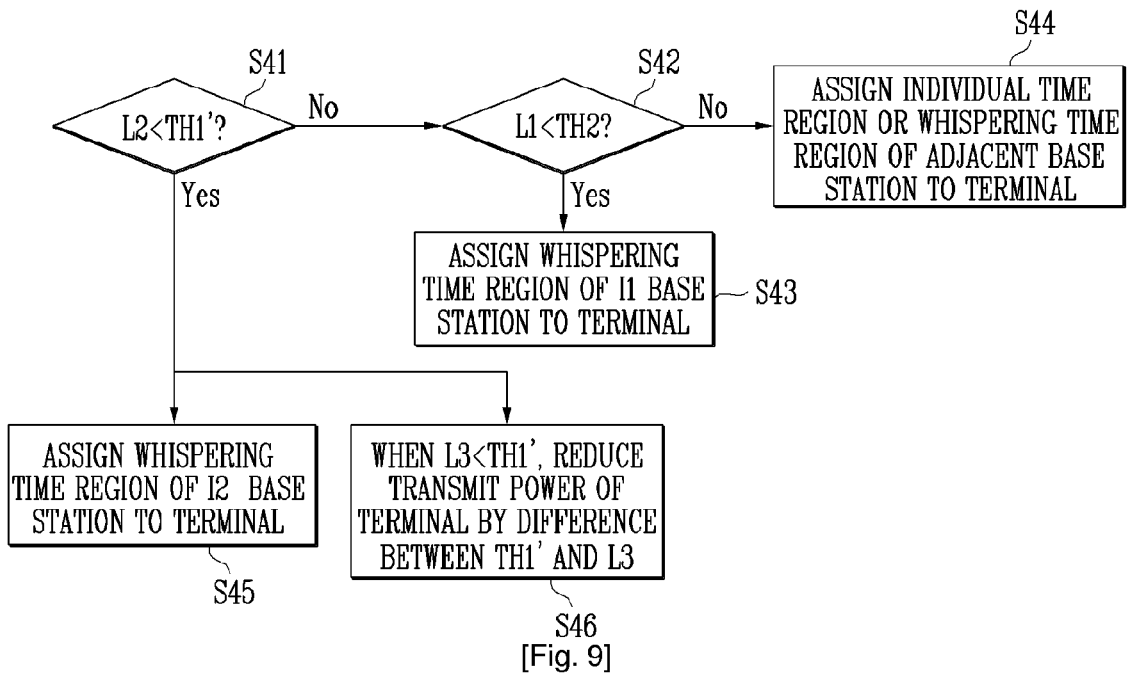
[Fig. 8]
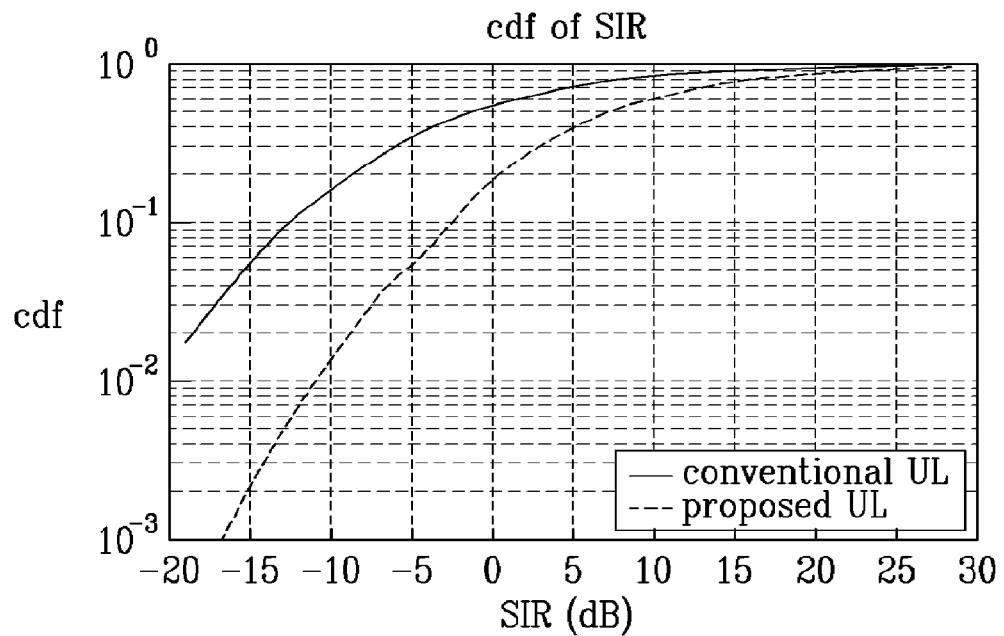
[Fig. 9]

[Fig. 10]
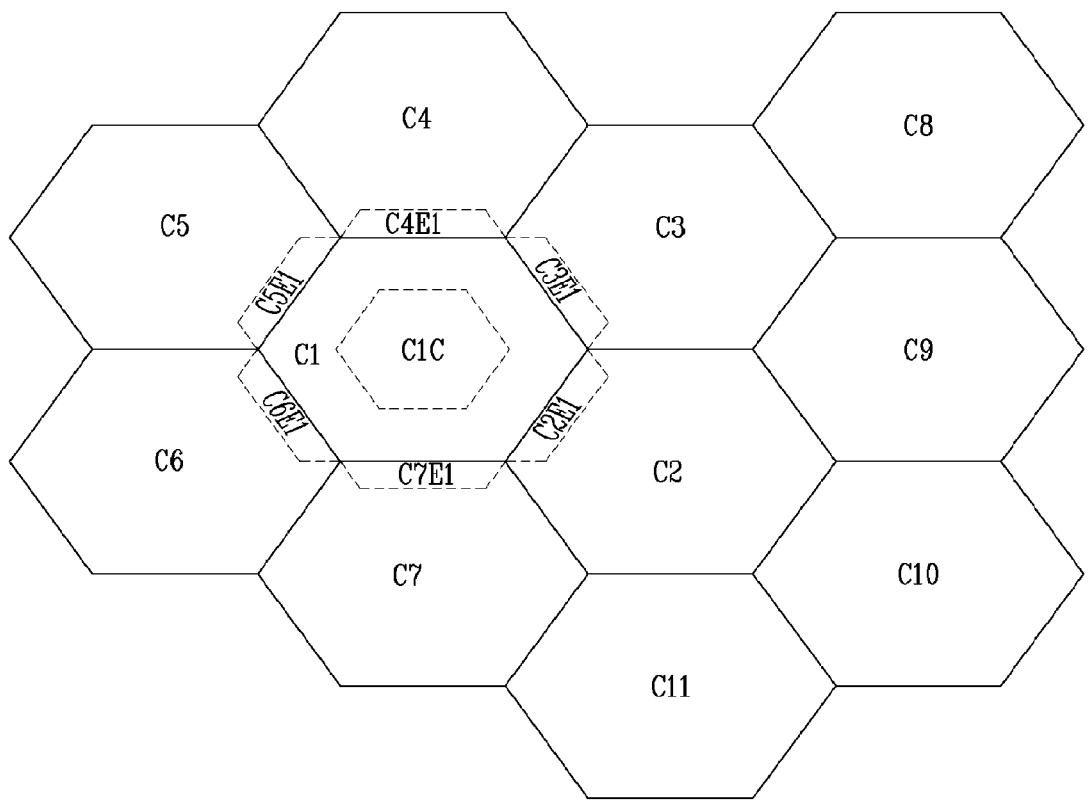
[Fig. 11]
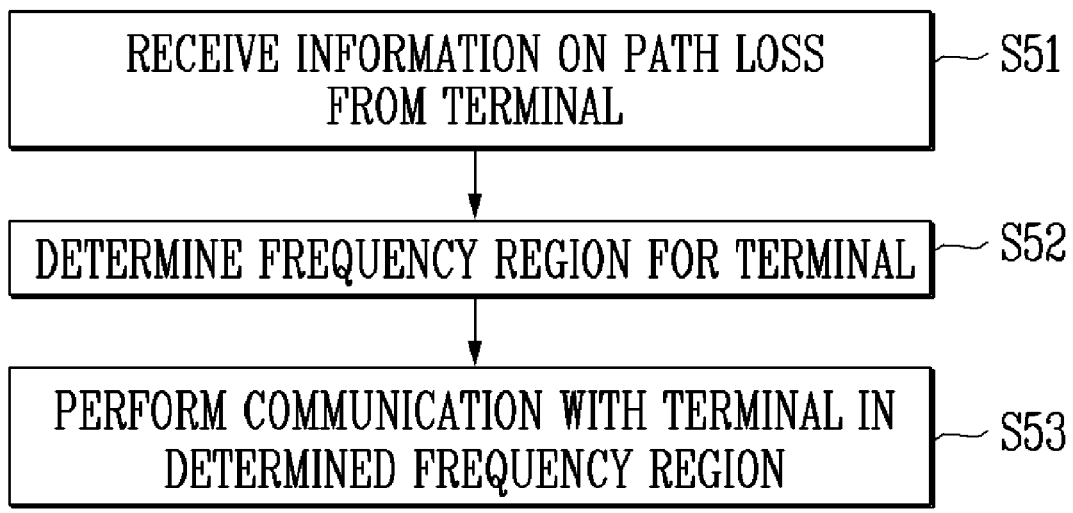

[Fig. 12]
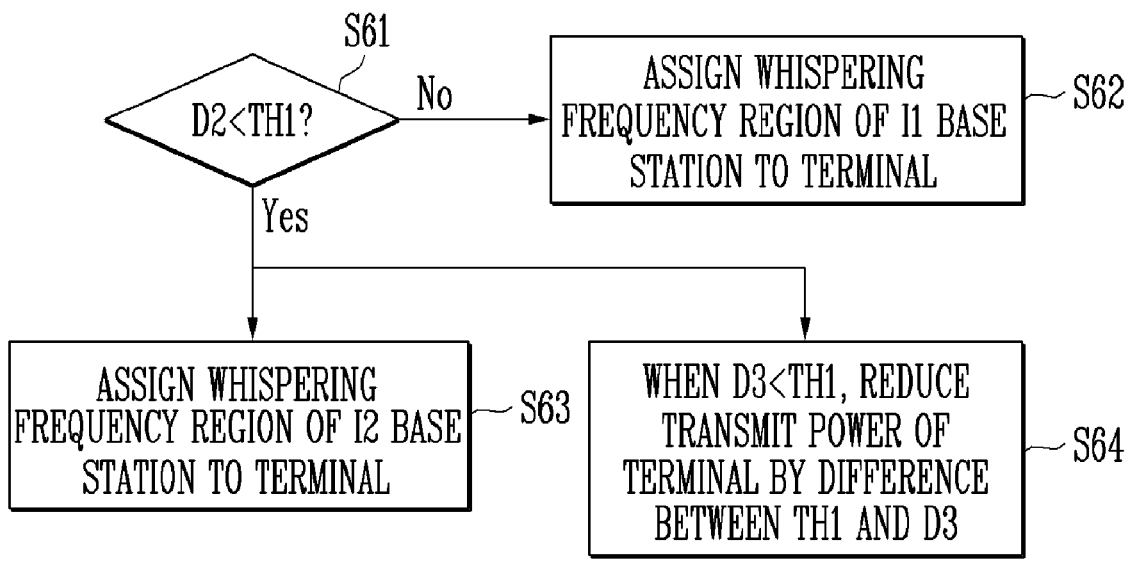
[Fig. 13]
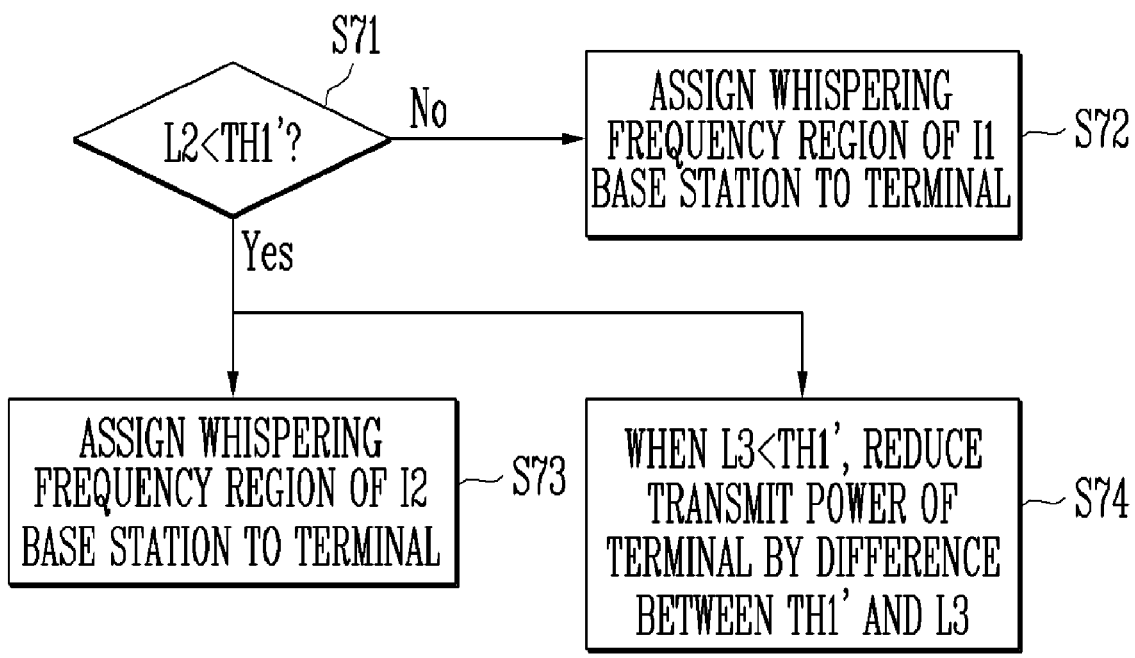

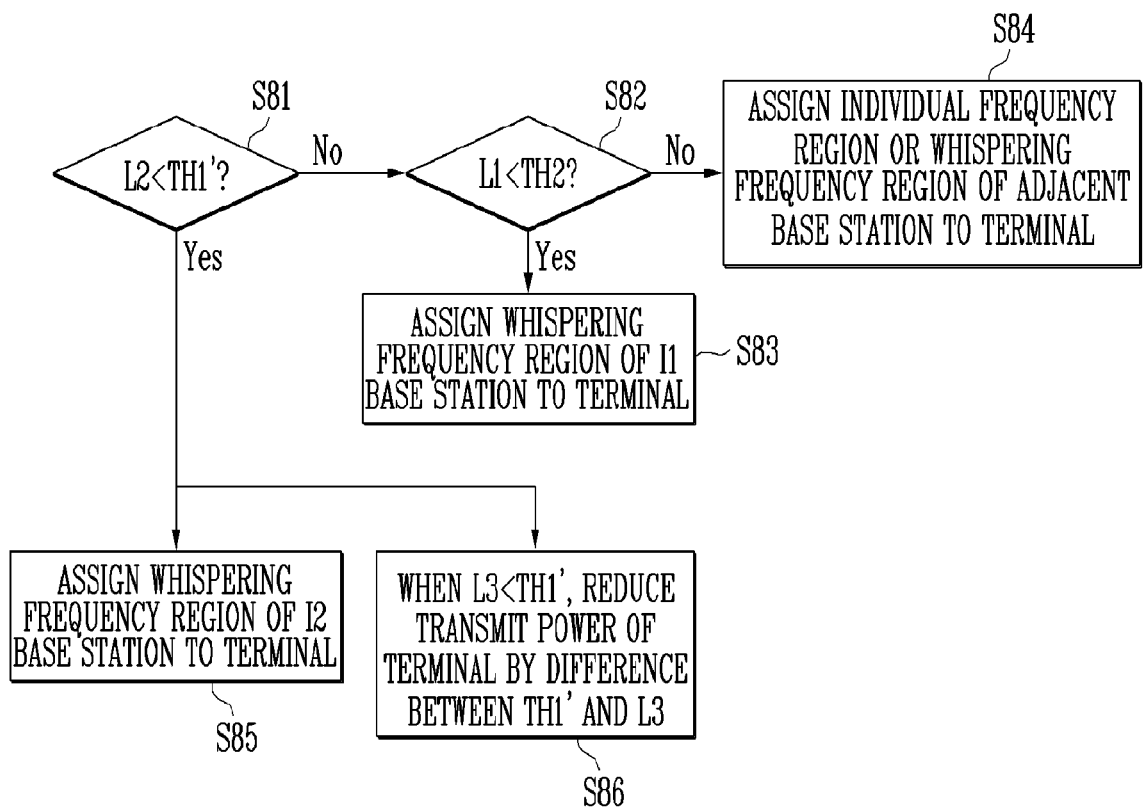
[Fig. 14]

METHOD OF CONTROLLING BASE STATIONS TO SUPPRESS INTER-CELL INTERFERENCE

BACKGROUND ART

1. Field of the Invention

The present invention relates to a method of controlling base stations, and more particularly, to a method of controlling base stations that is capable of suppressing inter-cell interference.

2. Description of Related Art

In a conventional frequency division multiple access ("FDMA")/time division multiple access ("TDMA") based cellular system, adjacent cells do not share resources for avoidance of interference. This allows a sufficient signal to interference ratio while low frequency reuse efficiency of the system results in reduced system capacity.

In the prior art FDMA/TDMA systems, voice service having a substantially constant data rate is mainly provided. To expand the system capacity, it is required to increase the number of available channels having a sufficient signal to interference ratio through power control. Code division multiple access ("CDMA") based cellular systems have spread since they are capable of significantly increasing the frequency reuse efficiency. CDMA systems reduce a variation in interference with each channel through interference averaging, allowing most of channels to suffer moderate interference for a voice call.

This method, however, is no longer optimal as primary service has shifted from voice service of constant data rate to packet service of variable data rate. In addition, an issue of addressing interference between adjacent cells has been raised as an orthogonal frequency division multiplexing/orthogonal frequency division multiple access ("OFDM/OFDMA") technique capable of easily adopting interference avoidance is applied to a cellular domain.

FIG. 1 illustrates inter-cell interference. For convenience for illustration, two base stations BS1 and BS2 and three terminals MS1, MS2 and MS3 are shown in FIG. 1.

Referring to FIG. 1, a first terminal MS1 is located at a center of a first cell C1 and is in communication with a first base station BS1. The second terminal MS2 is located in the boundary of the first cell C1 that is adjacent to a second base station BS2, and is in communication with the first base station BS1. A third terminal MS3 is located in the boundary of the second cell C2 that is adjacent to the first base station BS1, and is in communication with the second base station BS2.

Signals forwarded from the third terminal MS3 to the first base station BS1 act as interference to the first base station BS1. When the first terminal MS1 and the third terminal MS3 use the same frequency for communication, a signal to interference ratio (SIR) for an up-link signal transmitted from the first terminal MS1 to the first base station BS1 is lowered due to interference by the third terminal MS3. However, because the first terminal MS1 and the first base station BS1 are very close to each other while the third terminal MS3 and the first base station BS1 are apart from each other, the interference is not great and the first terminal MS1 is capable of performing normal communication with the first base station BS1 despite the presence of interference by the third terminal MS3. That is, the first terminal MS1 and the third terminal MS3 are allowed to use the same frequency.

On the other hand, when the second terminal MS2 and the third terminal MS3 use the same frequency for communication, interference becomes very severe. That is, because there is no great difference between distance from the second terminal MS2 to the first base station BS1 and distance from the third terminal MS3 to the first base station BS1, interference by the third terminal MS3 is very strong, thereby lowering a signal to interference ratio of an up-link signal transmitted from the second terminal MS2 to the first base station BS1. Thus, the use of the same frequency in the second terminal MS2 and the third terminal MS3 leads to interference therebetween, which makes it difficult to perform communication.

To solve these problems, a method has been proposed in which a cell is divided into a boundary portion and a center portion for assignment of tone set. This method is disclosed in Korean Laid-open Patent Publication No. 2004-0076438.

However, the use of this method causes a problem in that only one-third of available tones are assigned to the boundary portion of the cell while two-thirds of the available tones are assigned to the center portion of the cell due to a relationship between the cell and neighboring cells. That is, the available tones cannot be used efficiently since only the one-third of the available tones are assigned to terminals located in a boundary portion of an actual cell even though the boundary portion accommodates much more terminals compared to a center portion.

SUMMARY OF THE INVENTION

Accordingly, the present invention is directed to a method of controlling base stations that is capable of suppressing inter-cell interference and efficiently utilizing available resources.

According to an aspect of the present invention, there is provided a method of controlling base stations, the method comprising steps of: (a) receiving information on path loss from a terminal; (b) determining a time region for the terminal based on the path loss information; and (c) performing communication with the terminal within the determined time region.

Preferably, the step (b) may comprise steps of: comparing a difference in path loss between a first base station to which the terminal belongs and a second base station which is the most significantly interfered with terminal to a predetermined threshold value; when the difference in the path loss is greater than the threshold value, assigning a whispering time region of the first base station to the terminal; and when the difference in the path loss is smaller than the threshold value, assigning a whispering time region of the second base station to the terminal. Further, the step (b) may comprise steps of: comparing path loss in the second base station which is which is the most significantly interfered with terminal to a predetermined threshold value; when the path loss is greater than the threshold value, assigning to the terminal a whispering time region of the first base station to which the terminal belongs; and when the path loss is smaller than the threshold value, assigning to the terminal a whispering time region of the second base station.

According to another aspect of the present invention, there is provided a method of controlling base stations, the method comprising steps of: (a) receiving information on path loss from a terminal; (b) determining a frequency region for the terminal based on the path loss information; and (c) performing communication with the terminal within the determined frequency region.

Preferably, the step (b) may comprise steps of: comparing a difference in path loss between a first base station to which the terminal belongs and a second base station which is the most significantly interfered with terminal to a predetermined threshold value; when the difference in the path loss is greater than the threshold value, assigning a whispering frequency region of the first base station to the terminal; and when the difference in the path loss is smaller than the threshold value, assigning a whispering frequency region of the second base station to the terminal. Further, the step (b) may comprise steps of: comparing path loss in the second base station which is the most significantly interfered with terminal to a predetermined threshold value; when the path loss is greater than the threshold value, assigning to the terminal a whispering frequency region of the first base station to which the terminal belongs; and when the path loss is smaller than the threshold value, assigning to the terminal a whispering frequency region of the second base station.

According to yet another aspect of the present invention, there is provided a method of controlling base stations, the method comprising steps of: (a) receiving information on path loss from a terminal; (b) determining a code region for the terminal based on the path loss information; and (c) performing communication with the terminal within the determined code region.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 illustrates inter-cell interference;

FIG. 2 illustrates a basic concept of a method of controlling base stations according to a first embodiment of the present invention;

FIGS. 3 and 4 illustrate positions of a cell in which terminals located at a center portion of the cell perform communication in the method of controlling base stations according to the first embodiment of the present invention;

FIG. 5 is a flowchart of a method of controlling base stations according to a first embodiment of the present invention;

FIGS. 6 to 8 illustrate exemplary steps of determining a time region in the method of controlling base stations according to the first embodiment of the present invention;

FIG. 9 illustrates a simulation result of an up-link signal to interference ratio (SIR) in a cumulative distribution function (CDF) at a center cell under seven cells represented in FIG. 3 according to a method for determining the time region represented in FIG. 7;

FIG. 10 illustrates a concept of a method of controlling base stations according to a second embodiment of the present invention;

FIG. 11 is a flowchart of a method of controlling base stations according to the second embodiment of the present invention; and FIGS. 12 to 14 illustrate exemplary steps of determining a frequency region in the method of controlling base stations according to the second embodiment of the present invention.

DETAILED DESCRIPTION OF THE PREFERRED EMBODIMENTS

Hereinafter, an exemplary embodiment of the present invention will be described in detail. However, the present invention is not limited to the embodiments disclosed below. Therefore, the present embodiment is provided for complete disclosure of the present invention and to fully inform the scope of the present invention to those ordinarily skilled in the art.

FIG. 2 illustrates a basic concept of a method of controlling base stations according to a first embodiment of the present invention.

In FIG. 2, there is shown eleven cells, and a base station is assumed to be at a center of each cell.

Referring to FIG. 2, when terminals located at a center portion C1C of a first cell C1 perform communication with a base station in the first cell C1, terminals located at boundary portions C2E1 to C7E1, adjacent to the first cell C1, of second to seventh cells C2 to C7 perform communication with respective base stations of the second to seventh cells C2 to C7. While terminals at the boundary portions C2E1 to C7E1, adjacent to the first cell C1, of the second to seventh cells C2 to C7 significantly interferes with the base station of the first cell C1 due to close proximity, the terminals located at the center portion C1C of the first cell C1 can obtain a sufficient signal to interference ratio by virtue of excellent signal quality. As a result, the terminals located at the center portion C1C of the first cell C1 and the terminals located at the boundary portions C2E1 to C7E1, adjacent to the first cell C1, of the second to seventh cells C2 to C7 can transmit signals to the base stations without suffering significant degradation of performance that is caused by inter-cell interference.

Thereafter, when the terminals located at the center portion of the second cell C2 perform communication with the base station of the second cell C2, terminals located at the boundary portions, adjacent to the second cell C2, of the first, third, seventh, ninth, tenth and eleventh cells C1, C3, C7, C9, C10 and C11 perform communication with respective base stations in the first, third, seventh, ninth, tenth and eleventh cells C1, C3, C7, C9, C10 and C11. It is also possible for the terminals to transmit signals to the base stations without suffering significant degradation of performance that is caused by inter-cell interference.

Terminals located at respective center portions of the third to seventh cells C3 to C7 and terminals located at adjacent boundary portions then transmit signals to the base stations in the same period of time.

By performing the communication in such a manner, it is possible to suppress interference between cells and terminals at cell boundary portions. Further, the terminals located at the boundary portion are allowed to perform communication during sufficient period of time since the terminals located at the center portion C1C of the first cell C1 and the terminals located at the boundary portion C2E1, adjacent to the first cell C1, of the second cell C2 perform communication during the same period of time.

FIGS. 3 and 4 illustrate positions of a cell in which terminals located at a center portion of the cell perform communication using the method of controlling base stations according to the first embodiment of the present invention.

Referring to FIG. 3, terminals located at a center portion of each of cells indicated by reference numeral W transmit a signal to a base station of each cell. For convenience of illustration, these cells are called whispering cells. Terminals located at boundary portions of whispering cells other than the cells indicated by reference number W transmit a signal to a base station of each cell. For convenience of illustration, these cells are called speaking cells. As indicated by arrows in FIG. 3, the speaking cells interfere with the whispering cell W. However, such interference does not obstruct smooth communication of terminals located at the center portion of the whispering cell W since the terminal are very close to the base station. That is, the terminals located at the center portion of the whispering cell W are less influenced by inter-cell interference in performing communications.

In FIG. 3, one-seventh of all cells are whispering cells W and remaining cells are speaking cells. Accordingly, the positions of the whispering cells W vary over time with seven patterns.

Referring to FIG. 4, terminals located at a center portion of each of the whispering cells indicated by reference numeral W transmit a signal to a base station in each cell. In the speaking cells other than the cells indicated by reference number W, terminals located at the boundary portion of whispering cells transmit a signal to the base station in each cell. In this case, one-third of all cells are whispering cells W and the remaining cells are speaking cells.

FIG. 5 is a flowchart of a method of controlling base stations according to a first embodiment of the present invention.

Referring to FIG. 5, a method of controlling base stations includes Step S11 of receiving information on path loss from a terminal, Step S12 of determining a time (resource) region for the terminal and Step S13 of performing communication with the terminal in the determined time region. By the method including such steps, the base station assigns the terminal to a desired time region to perform communication. If a cell structure is the same as that shown in FIG. 2, the first cell C1 is divided into at least seven time regions. Among them, a first time region is assigned to terminals located at the center portion C1C of the first cell C1, a second time region is assigned to terminals located at places, adjacent to the second cell C2, of the first cell C1, and third to seventh time regions are assigned to terminals located at places, adjacent to the third to seventh cells C3 to C7, of the first cell C1. With the above-described method, the terminal is assigned to any one of the seven time regions to perform communication with the base station. Of course, if the cell structure is not the same as that shown in FIG. 2, one cell may have seven or more or less time regions. The path loss information refers to information on path loss of a signal transmitted from a base station to which the terminal belongs, to the terminal and path loss of a signal transmitted from adjacent base stations to the terminal. The path loss may be obtained from strength of a pilot signal the terminal receives from the base stations. The path loss may be represented by Equation 1:

$$L1 = PS1 - PR1 \qquad \text{<Equation 1>}$$

In Equation 1, L1 indicates path loss related to the first base station, PS1 indicates strength of a pilot signal transmitted from the first base station, and PR1 indicates strength of a pilot signal received at the terminal. Loss values on paths from the base stations to the terminals may be forwarded as path loss information to the base station. Simply, strengths of pilot signals received from the base stations may be forwarded as the path loss information to the base station and actual path loss values may be obtained through operation in the base station.

The path loss information may be forwarded to the base station in the form of an inter-cell interference vector as represented by Equation 2.

$$Vid = (I1, I2, \ldots Im)$$

$$Vpl = (L1, L2, \ldots Lm) \qquad \text{<Equation 2>}$$

In Equation 2, Vid indicates a cell ID vector, and Vpl indicates a path loss vector. Further, path loss values that are elements of the path loss vector are all positive numbers in dB and $L1 \leq L2 < \ldots \leq Lm$. Elements of the cell ID vector are unique identifiers of a base station, i.e., a cell having relevant path loss. The vector is directed from a base station having less path loss, i.e., a base station believed as being close on the path. Accordingly, the first element I1 of the vector indicates a base station that serves the terminal. The second element I2 of the vector indicates a base station which is the most significantly interfered with terminal. For convenience of understanding, if the terminal is located in the first cell of FIG. 2, the first element I1 of the vector indicates the base station of the first cell C1. If the terminal is located at a place, adjacent to the second cell C2, of the first cell C1, the terminal will most significantly interfere with a base station of the second cell C2 among the base stations of the adjacent cells C2 to C7, and accordingly, the second element I2 of the vector indicates the base station of the second cell C2. Similarly, if the terminal is located at a place, adjacent to the third cell C3, of the first cell C1, the second element I2 of the vector indicates the base station of the third cell C3, and if the terminal is located at a place, adjacent to the one of the fourth to seventh cells C4 to C7, of the first cell C1, the second element I2 of the vector indicates the base station of one of the fourth to seventh cells C4 to C7. For application of the present invention, such vectors should have at least two or more elements for best performance. In the present invention, the path loss includes loss due to distance and loss due to slow fading, i.e., shadowing. However, the path loss does not include loss due to fast fading for which link adaptation is impossible.

In Step S12 of determining the time region for the terminal, the base station assigns the time region to the terminal based on path loss information from a served terminal. As described above, the path loss information may be the inter-cell interference vector. If the path loss L2, related to the adjacent base station I2, of the inter-cell interference vector of the terminal is small, the relevant terminal will significantly interfere with the adjacent base station I2. Accordingly, the base station I1 assigns the time region to the terminal so that the terminal performs up-link communication concurrently with terminals located at a center portion of the relatively less interfered, adjacent base station I2. For convenience of illustration, this time region is referred to as a whispering time region of the adjacent base station I2. On the other hand, in the case where the path loss L2, related to the adjacent base station I2, of the inter-cell interference vector of the terminal is great, when the terminal performs the up-link communication, the terminal is less influenced by other terminals that perform the up-link communication in the adjacent base stations. The base station I1 assigns the time region for the terminal so that the terminal performs the up-link communication concurrently with terminals located at a boundary portion of a cell to which the adjacent base station I2 belongs. For convenience of illustration, this time region is referred to as a whispering time region of the base station I1. In summary, time regions are assigned to terminals so that terminals located in cells adjacent to a predetermined cell and significantly interfering with the predetermined cell and terminals located in the predetermined cell and having sufficient signal strength perform simultaneous communication. That is, the terminals located in cells adjacent to a predetermined cell and significantly interfering with the predetermined cell and the terminals located in the predetermined cell and having sufficient signal strength are assigned a whispering time region of the predetermined cell.

In Step S13 of performing communication with the terminal in the determined time region, the base station performs communication with the terminal in the time region to which the terminal belongs. If there are located six cells in the vicinity of one cell as represented in FIG. 3, the cell is divided into seven regions, i.e., one region that has a great signal to interference ratio since the cell has great signal strength even though it interferes with adjacent cells, and six regions interfering with six neighboring cells. In this case, because terminals in the regions of the cell perform sequential communication, each region is allowed to perform communication during 1/7 period of time. Of course, there may be several terminals that are allowed to communicate with the base station during their time region, and each terminal performs communication within its assigned range of time or frequency in the time region.

FIG. 6 illustrates an exemplary step of determining a time region in the method of controlling base stations according to the first embodiment of the present invention.

Referring to FIG. 6, Step of determining the time region includes Step S21 of comparing a difference ("D2") in path loss between an I1 base station and an I2 base station to a first threshold value ("TT1"); Step S22 of assigning a whispering time region of the I1 base station to a terminal when D2 is greater than the first threshold value; and Step S23 of assigning a whispering time region of the I2 base station to the terminal when D2 is smaller than the first threshold value. The step of determining the time region may further include Step S24 of, when D2 is smaller than the first threshold value, comparing a difference ("D3") in path loss between the I1 base station and an I3 base station to the first threshold value and, when D3 is smaller than the first threshold value, reducing transmit power of the terminal by the difference between the first threshold value and D3.

This method is especially effective when receive power of the base station is substantially fixed and may be lowered if necessary.

Advantageously, by the method further including Step S24, it is possible to lower interference with the I3 base station of a terminal, which interferes with the I3 base station as well as the I2 base station, to be a predetermined value or less. More specifically, if it is assumed that there is no step S24 and the terminal significantly interferes with the respective base stations I2 and I3 of the two adjacent cells, the terminal may not interfere with the base station I2 by adopting Step S23, i.e., by assigning the whispering time region of the I2 base station to the terminal so that only the terminal and terminals located at the center portion of the I2 base station perform simultaneous transmission and reception. There is no method to eliminate the interference with the base station I3 of the remaining cell. Accordingly, it is desirable to lower the transmit power of the terminal in order to reduce the interference with the I3 base station.

FIG. 7 illustrates another exemplary step of determining a time region in the method of controlling base stations according to the first embodiment of the present invention.

Referring to FIG. 7, Step of determining the time region includes Step S31 of comparing path loss L2 in an I2 base station to a first threshold value ("TH1"); Step S32 of assigning a whispering time region of an I1 base station to the terminal when L2 is greater than the first threshold value; and Step S33 of assigning a whispering time region of the I2 base station to the terminal when L2 is smaller than the first threshold value. The step of determining the time region may further include Step S34 of, when L2 is smaller than the first threshold value, comparing path loss L3 in an I3 base station to the first threshold value and, when L3 is smaller than the first threshold value, reducing transmit power of the terminal by a difference between the first threshold value and L3.

This method is especially effective when the transmit power of the base station is substantially fixed and may be lowered if necessary. Advantageously, by the method further including Step S34, it is possible to lower the path loss related to the I3 base station of a terminal, which interferes with the I3 base station as well as the I2 base station, to be a predetermined value or less.

FIG. 8 illustrates yet another exemplary step of determining a time region in the method of controlling base stations according to the first embodiment of the present invention.

Referring to FIG. 8, Step of determining the time region includes Step S41 of comparing path loss L2 in an I2 base station to a first threshold value ("TH1"); Step S42 of, when L2 is greater than the first threshold value, comparing the path loss L1 in the I1 base station to a second threshold value ("TH2"); Step S43 of, when L1 is smaller than the second threshold value, assigning a whispering time region of the I1 base station to the terminal; Step S44 of, when L1 is greater than the second threshold value, assigning an individual time region or a whispering time region of an adjacent base station to the terminal; and Step S45 of, when L2 is smaller than the first threshold value, assigning a whispering time region of the I2 base station to the terminal. The step of determining the time region may further include Step S46 of, when L2 is smaller than the first threshold value, comparing path loss L3 in an I3 base station to the first threshold value and, when L3 is smaller than the first threshold value, reducing transmit power of the terminal by a difference between the first threshold value and L3.

This method is especially effective when the transmit power of the base station is substantially fixed. Further, by the method further including Step S46, it is possible to lower the interference with the I3 base station of a terminal, which interferes with the I3 base station as well as the I2 base station, to be a predetermined value or less.

Further, from the comparison with the method described in FIG. 7, it can be seen that, by the method represented in FIG. 8 further including Step S44, it is possible to increase a signal to interference ratio of a terminal having great path loss related to the I1 base station by assigning the terminal to the speaking region or individual region. That is, if the path loss depends on distance, two values L1 and L2 are difficult to be simultaneously great. In a shaded environment, the path losses may be both great due to presence of buildings. If the L1 value is greater than the second threshold value, strength of the signal to interference ratio at the I1 base station is low, and consequently, it is not suitable to assign the terminal to the whispering time region of the I1 base station. It is necessary to assign the terminal to an individual time region in which interference from adjacent cells is less or to a whispering time region of the adjacent cell. Here, the individual time region refers to a time region not greatly interfering with adjacent cells and is a remaining region other than time regions of the whispering cells and adjacent cells in a random cell structure.

FIG. 9 illustrates a simulation result of an up-link signal to interference ratio (SIR) in a cumulative distribution function (CDF) at a center cell under seven cells represented in FIG. 3 according to a method for determining the time region represented in FIG. 7.

Referring to FIG. 9, a conventional scheme uses avoidance of interference without dividing a region like simple OFDMA while the proposed scheme divides a time region based on only the first threshold value TH1 and uses only avoidance of interference. In one simulation, one terminal in a center cell is created at any position and then a number of terminals in adjacent cells are created at several times to obtain respective signal to interference ratios. A relatively small value corresponding to 95% or higher of the obtained values is taken as a representative stable value. This value is defined as a stably predicted signal to interference ratio value for that terminal. This process is repeated to obtain the result through several creations of terminals in the center cell. From the simulation result, it can be seen that the proposed scheme provides significantly improved performance. For example, a ratio of terminals having the signal to interference ratio of −5 dB or less is on the order of 35% in the conventional scheme while it is on the order of 5% in the proposed scheme. It can be seen that the proposed scheme significantly reduces the ratio of terminals having a low signal to interference ratio. The result represented in FIG. 9 was obtained without application of interference averaging in the divided regions. In the present invention, the avoidance of interference is achieved in the divided regions, and thus, there is no limitation to processing of interference in the divided regions. Accordingly, if adaptive modulation and coding (AMC) is not performed on the basis of a small resource within the region, it is preferable to adopt interference averaging through spread spectrum such as frequency hopping.

FIG. 10 illustrates a concept of a method of controlling base stations according to a second embodiment of the present invention. In FIG. 10, there are represented eleven cells and a base station is assumed to be at a center of each cell.

Referring to FIG. 10, terminals located at the center portion C1C of the first cell C1 and terminals located at boundary portions C2E1 to C7E1, adjacent to the first cell C1, of the second to seventh cells C2 to C7 use the same frequency to perform communication with the base station of the cell to which each terminal belongs. While the terminals located at the boundary portions C2E1 to C7E1, adjacent to the first cell C1, of the second to seventh cells C2 to C7 cause considerable interference due to close proximity to the base station of the first cell C1, terminals located at the center portion C1C of the first cell C1 may obtain a sufficient signal to interference ratio because of very excellent signal quality. As a result, the terminals located at the center portion C1C of the first cell C1 and the terminals located at the boundary portions C2E1 to C7E1, adjacent to the first cell C1, of the second to seventh cells C2 to C7 can transmit signals to the base stations without suffering significant degradation of performance that is caused by inter-cell interference.

Similarly, the terminals located at the center portion of the second cell C2 and terminals located at the boundary portions, adjacent to the second cell C2, of the first, third, seventh, ninth, tenth and eleventh cells C1, C3, C7, C9, C10 and C11 use the same frequency to perform communication with base stations to which the respective terminals belong. Of course, the terminals located at the center portion of the second cell C2 and the terminals located at the center portion of the first cell C1 use a different frequency. It is possible for the respective terminals to transmit signals to the base stations with suffering less inter-cell interference.

Further, the terminals located at the center portion of the third cell C3 and terminals located at boundary portions of cells adjacent to the third cell C3 are assigned the same frequency for communication. The fourth to seventh cells C4 to C7 are assigned a frequency for communication in a similar manner. Of course, terminals located at the center portions of the first to seventh cells use a different frequency for communication.

By performing communication in such a manner, it is possible to suppress inter-cell interference. Further, the terminals located at the center portion C1C of the first cell C1 and terminals located at the boundary portion C2E1, adjacent to the first cell C1, of the second cell C2 use the same frequency for communication, thereby allowing sufficient frequencies to be assigned to the terminals located at the boundary portions.

FIG. 11 is a flowchart of a method of controlling base stations according to the second embodiment of the present invention.

Referring to FIG. 11, a method of controlling base stations includes Step S51 of receiving information on path loss from a terminal, Step S52 of determining a frequency (resource) region for the terminal, and Step S53 of performing communication with the terminal in the determined frequency region.

The step S51 of receiving information on path loss related to a terminal is similar to Step S11 of FIG. 5, and detailed description thereof will be omitted.

In Step S52 of determining a frequency region for the terminal, the base station uses path loss information related to the served terminal to assign the frequency region to the terminal. In assigning the frequency region, terminals located in cells adjacent to and significantly interfering with a pre-determined cell and terminals located in the pre-determined cell and having sufficient signal strength are assigned the same frequency region. For convenience of illustration, the frequency region assigned to the terminals located in the pre-determined cell and relatively less interfering with terminals in adjacent cells is called a whispering frequency region of the cell.

In Step S53 of performing communication in the determined frequency region, the base station performs communication with the terminal within the frequency region to which the terminal belongs. When six cells are located in the vicinity of one cell as represented in FIG. 10, the cell is divided into seven regions, i.e., one region in which a signal to interference ratio is great since signal strength is great despite the presence of interference with adjacent cells, and six regions interfering with six neighboring cells. One cell is divided into at least seven frequency regions and the regions of the cell are assigned a different frequency.

FIG. 12 illustrates an exemplary step of determining a frequency region in the method of controlling base stations according to the second embodiment of the present invention.

Referring to FIG. 12, Step of determining the frequency region includes Step S61 of comparing a difference ("D2") in path loss between an I1 base station and an I2 base station to a first threshold value ("TH1"); Step S62 of, when D2 is greater than the first threshold value, assigning a whispering frequency region of the I1 base station to the terminal; and Step S63 of, when D2 is smaller than the first threshold value, assigning a whispering frequency region of the I2 base station to the terminal. The step of determining the frequency region may further include Step S64 of, when D2 is smaller than the first threshold value, comparing a difference ("D3") in path loss between the I1 base station and an I3 base station to the first threshold value and, when D3 is smaller than the first threshold value, reducing transmit power of the terminal by a difference between the first threshold value and D3.

FIG. 13 illustrates another exemplary step of determining a frequency region in the method of controlling base stations according to the second embodiment of the present invention.

Referring to FIG. 13, Step of determining the frequency region includes Step S71 of comparing path loss L2 in an I2 base station to a first threshold value ("TH1"); Step S72 of, when L2 is greater than the first threshold value, assigning a whispering frequency region of the I1 base station to the terminal; and Step S73 of, when L2 is smaller than the first threshold value, assigning a whispering frequency region of the I2 base station to the terminal. The step of determining a frequency region may further include Step S74 of, when L2 is smaller than the first threshold value, comparing path loss L3 in an I3 base station to the first threshold value and, when L3 is smaller than the first threshold value, reducing transmit power of the terminal by a difference between the first threshold value and L3.

FIG. 14 illustrates yet another exemplary step of determining a frequency region in the method of controlling base stations according to the second embodiment of the present invention.

Referring to FIG. 14, Step of determining the frequency region includes Step S81 of comparing path loss L2 in an I2 base station to a first threshold value ("TH1"); Step S82 of, when L2 is greater than the first threshold value, comparing the path loss L1 in the I1 base station to a second threshold value ("TH2"); Step S83 of, when L1 is smaller than the second threshold value, assigning a whispering frequency region of the I1 base station to the terminal; Step S84 of, when L1 is greater than the second threshold value, assigning an individual frequency region or a whispering frequency region of an adjacent base station to the terminal; and Step S85 of, when L2 is smaller than the first threshold value, assigning a whispering frequency region of the I2 base station to the terminal. The step of determining the frequency region may further include Step S86 of, when L2 is smaller than the first threshold value, comparing path loss L3 in an I3 base station to the first threshold value and, when L3 is smaller than the first threshold value, reducing transmit power of the terminal by a difference between the first threshold value and L3.

In the method of controlling base stations according to the second embodiment of the present invention, which has been described with reference to FIGS. 10 to 14, one cell is divided in several regions and each region is assigned a different frequency for avoidance of inter-cell interference. In the method of controlling base stations according to the third embodiment of the present invention, one cell is divided into several regions and each region is assigned a different code for avoidance of inter-cell interference. The code indicates, for example, the same orthogonal code or frequency hopping pattern between cells. The method of controlling base stations according to the third embodiment of the present invention is the same as that according to the second embodiment of the present invention except that a code region is used instead of a frequency region, and detailed description thereof will be omitted.

With the method of controlling base stations according to the present invention, it is possible to obtain a great signal to interference ratio, to provide a gain over all data rates of each cell, and to increase a data rate for users at a cell boundary where signal quality is very poor by suppressing interference with the users.

Further, with the method of controlling base stations according to the present invention, it is possible to efficiently utilize available resources by assigning sufficient time, frequency or code to terminals located at boundary portions of cells.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

The invention claimed is:

1. A method of controlling base stations, each base station covering a cell and being assigned a plurality of time slots, each cell defining an inner region and a plurality of outer regions surrounding the inner region, the method comprising:
   receiving information on path loss from a target terminal disposed in a first cell covered by a first base station, the first cell being surrounded by a plurality of cells covered by base stations different from the first base station;
   determining a time region for the target terminal based on the path loss information, wherein the first base station has a plurality of time slots assigned to a plurality of terminals located in the first cell, the plurality of time slots including a first time slot associated with an inner region of the first cell and a plurality of second time slots associated with outer regions of the first cell, each second time slot corresponding to a first time slot of an inner region of one of the cells surrounding the first cell; and
   performing communication with the target terminal within the determined time region.

2. The method according to claim 1, wherein the determining step comprises:
   comparing a difference in path loss between the first base station in the first cell to which the target terminal belongs and a second base station which is the most significantly interfered with the target terminal to a predetermined threshold value, the second base station being one of the base stations covering the plurality of cells surrounding the first cell;
   assigning the first time slot of the first base station to the target terminal if the difference in the path loss is greater than the threshold value; and
   assigning a first time slot of the second base station to the target terminal if the difference in the path loss is smaller than the threshold value.

3. The method according to claim 2, wherein the determining step further comprises, if the difference in path loss is smaller than the threshold value, comparing a difference in path loss between the first base station and a third base station which is the second most significantly interfered with the target terminal to the threshold value, the third base station being one of the base stations covering the plurality of cells surrounding the first cell and
   wherein if the difference in the path loss between the first base station and the third base station is smaller than the threshold value, reducing transmit power of the target terminal by a difference between the difference in the path loss between the first base station and the third base station and the threshold value.

4. The method according to claim 1, wherein the determining step comprises:
   comparing path loss in a second base station which is the most significantly interfered with the target terminal to a predetermined threshold value, the second base station being one of the base stations covering the plurality of cells surrounding the first cell;
   if the path loss is greater than the threshold value, assigning to the target terminal the first time slot of the first base station in the first cell to which the target terminal belongs; and
   if the path loss is smaller than the threshold value, assigning a first time slot of the second base station to the target terminal.

5. The method according to claim 4, wherein the determining step comprises, if the path loss is smaller than the threshold value, comparing path loss in a third base station which is the second most significantly interfered with the target terminal to the threshold value, the third base station being one of the base stations covering the plurality of cells surrounding the first cell, and
   wherein if the path loss in the third base station is smaller than the threshold value, reducing transmit power of the target terminal by a difference between the path loss in the third base station and the threshold value.

6. The method according to claim 1, wherein the determining step comprises:

comparing path loss in a second base station which is the most significantly interfered with the target terminal to a first threshold value, the second base station being one of the base stations covering the plurality of cells surrounding the first cell;

if the path loss in the second base station is greater than the first threshold value, comparing path loss in the first base station in the first cell to which the target terminal belongs, to a second threshold value;

if the path loss in the first base station is smaller than the second threshold value, assigning the first time lot of the first base station to the target terminal;

if the path loss in the first base station is greater than the second threshold value, assigning to the target terminal either an individual time slot or a first time slot of the base station adjacent to the first base station; and if the path loss in the second base station is smaller than the first threshold value, assigning a first time slot of the second base station to the target terminal.

7. The method according to claim 6, wherein the determining step further comprises, if the path loss in the second base station is smaller than the first threshold value, comparing path loss in a third base station which is the second most significantly interfered with the target terminal to the first threshold value, the third base station being one of the base stations covering the plurality of cells surrounding the first cell, and, wherein if the path loss in the third base station is smaller than the first threshold value, reducing transmit power of the target terminal by a difference between the path loss in the third base station and the first threshold value.

8. The method according to claim 1, wherein the path loss information includes information on path loss of a signal transmitted from the first base station in the first cell to which the target terminal belongs to the target terminal and path loss of signals transmitted from the base stations adjacent to the first base station to the target terminal.

9. The method according to claim 8, wherein the signal transmitted from the base station is a pilot signal.

10. The method according to claim 1, wherein the path loss information is forwarded to the base station in the form of an inter-cell interference vector.

11. The method according to claim 1, wherein the communication is an up-link communication.

12. The method according to claim 1, wherein the number of the time slots are seven, the first time slot is assigned to terminals located at the inner region of the first cell, and second to seventh time slots are assigned to terminals located at second to seventh outer regions of the first cell that are adjacent to cells corresponding to six base stations disposed close to the first base station in the first cell.

13. A method of controlling base stations, the method comprising:

receiving information on path loss from a target terminal disposed in a first cell covered by a first base station;

determining a frequency region for the target terminal based on the path loss information, wherein the first base station has a plurality of frequency regions assigned to terminals located in the first cell, and the plurality of frequency regions includes a first frequency region assigned to terminals located in a central portion of the first cell and a plurality of second frequency regions assigned to terminals located at boundary portions surrounding the central portion, each second frequency region corresponding to a first frequency region assigned to a central portion of one of base stations adjacent to the first base station; and performing communication with the target terminal within the determined frequency region.

14. The method according to claim 13, wherein the determining step comprises:

comparing a difference in path loss between the first base station in the first cell to which the target terminal belongs and a second base station which is the most significantly interfered with the target terminal to a predetermined threshold value, the second base station being one of the base stations adjacent to the first base station;

if the difference in the path loss is greater than the threshold value, assigning the first frequency region of the first base station to the target terminal; and if the difference in the path loss is smaller than the threshold value, assigning a first frequency region of the second base station to the target terminal.

15. The method according to claim 14, wherein the determining step further comprises:

if the difference in path loss is smaller than the threshold value, comparing a difference in path loss between the first base station and a third base station which is the second most significantly interfered with the target terminal to the threshold value, the third base station being one of the base stations adjacent to the first base station; and if the difference in the path loss between the first base station and the third base station is smaller than the threshold value, reducing transmit power of the target terminal by a difference between the difference in the path loss between the first base station and the third base station and the threshold value.

16. The method according to claim 13, wherein the determining step comprises:

comparing path loss in a second base station which is the most significantly interfered with the target terminal to a predetermined threshold value, the second base station being one of the base stations adjacent to the first base station;

if the path loss is greater than the threshold value, assigning to the target terminal the first frequency region of the first base station in the first cell to which the target terminal belongs; and if the path loss is smaller than the threshold value, assigning a first frequency region of the second base station to the target terminal.

17. The method according to claim 16, wherein the determining step comprises:

if the path loss is smaller than the threshold value, comparing path loss in a third base station which is the second most significantly interfered with the target terminal to the threshold value, the third base station being one of the base stations adjacent to the first base station; and if the path loss in the third base station is smaller than the threshold value, reducing transmit power of the target terminal by a difference between the path loss in the third base station and the threshold value.

18. The method according to claim 13, wherein the determining step comprises:

comparing path loss in a second base station which is the most significantly interfered with the target terminal to a first threshold value, the second base station being one of the base stations adjacent to the first base station;

if the path loss in the second base station is greater than the first threshold value, comparing path loss in the first base station in the first cell to which the terminal belongs, to a second threshold value;

if the path loss in the first base station is smaller than the second threshold value, assigning the first frequency region of the first base station to the target terminal;

if the path loss in the first base station is greater than the second threshold value, assigning to the target terminal either an individual frequency region or a first frequency region of a base station adjacent to the first base station; and if the path loss in the second base station is smaller than the first threshold value, assigning a first frequency region of the second base station to the target terminal.

19. The method according to claim 18, wherein the determining step further comprises:

if the path loss in the second base station is smaller than the first threshold value, comparing path loss in a third base station which is the second most significantly interfered with the target terminal to the first threshold value, the third base station being one of the base stations adjacent to the first base station; and if the path loss in the third base station is smaller than the first threshold value, reducing transmit power of the target terminal by a difference between the path loss in the third base station and the first threshold value.

20. The method according to claim 13, wherein the communication is an up-link communication.

21. A method of controlling base stations, the method comprising:

receiving information on path loss from a target terminal disposed in a first cell covered by a first base station;

determining a code region for the target terminal based on the path loss information, wherein the first base station has a plurality of code regions assigned to terminals located in the first cell, and the plurality of code regions includes a first code region assigned to terminals located in a center portion of the first cell and second to Nth code regions assigned to terminals located in boundary portions surrounding the center portion, the second to Nth code regions corresponding to first code regions of base stations adjacent to the first base station, respectively, the code regions using different codes from each other, and N being a positive integer; and performing communication with the target terminal within the determined code region.

* * * * *